Figure 1:
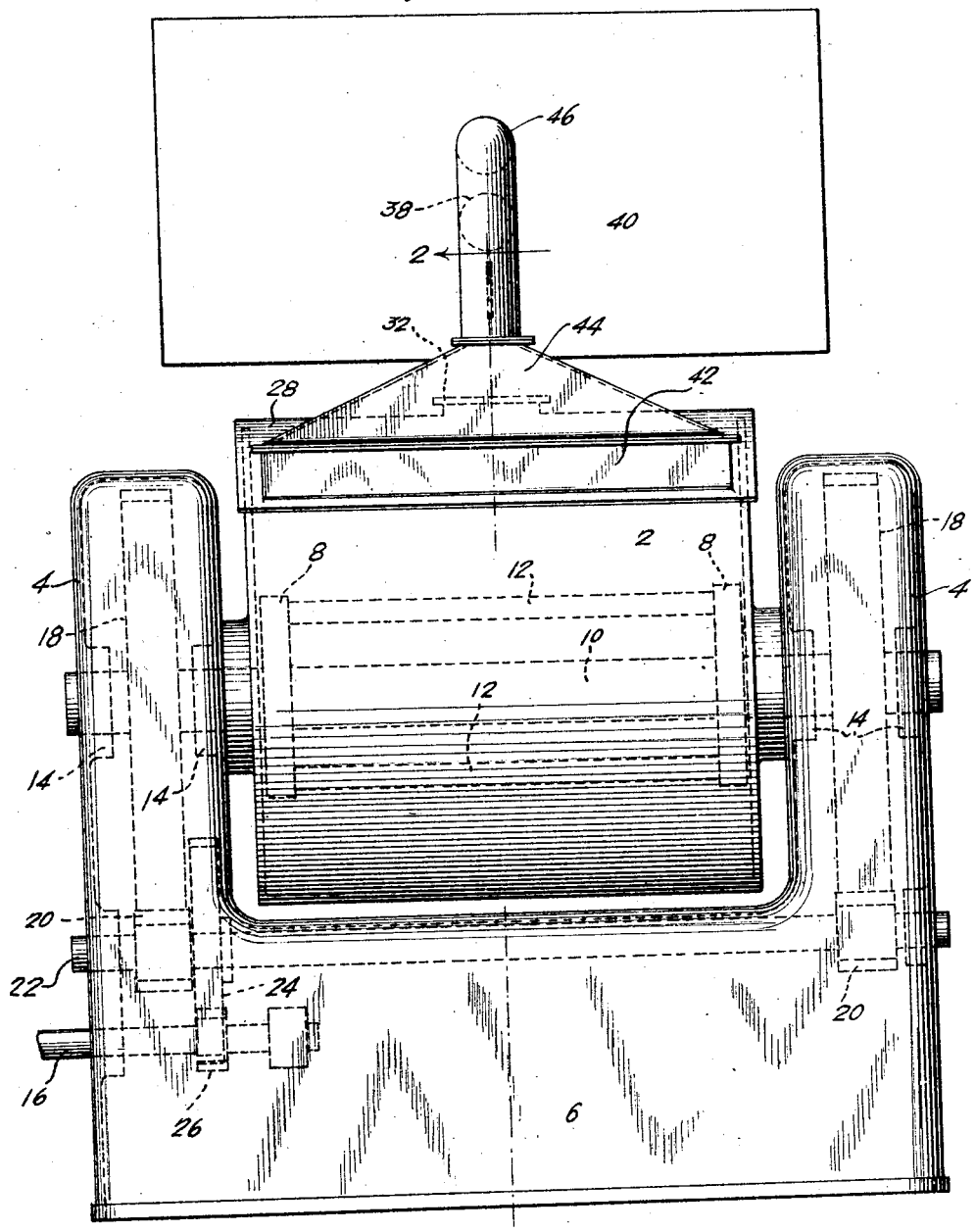

Oct. 9, 1928.

L. S. HARBER 1,686,967

AIR COOLING MEANS FOR MIXING DEVICES

Filed Nov. 28, 1923  2 Sheets-Sheet 1

INVENTOR
LAURENCE S. HARBER
BY
ATTORNEYS

Oct. 9, 1928.
L. S. HARBER
1,686,967
AIR COOLING MEANS FOR MIXING DEVICES
Filed Nov. 28, 1923   2 Sheets-Sheet 2
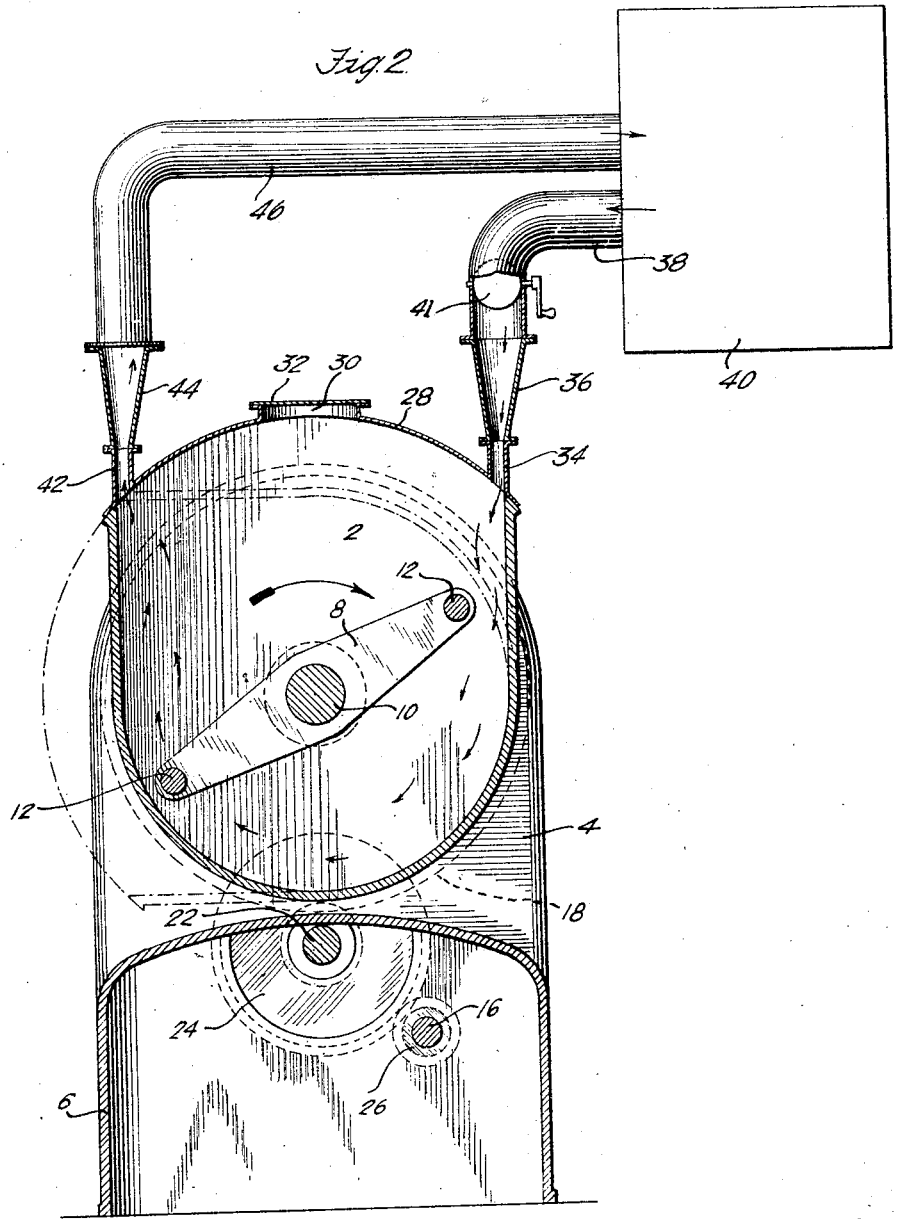
INVENTOR
LAURENCE S. HARBER
BY
ATTORNEYS Patented Oct. 9, 1928.

1,686,967

UNITED STATES PATENT OFFICE.

LAURENCE S. HARBER, OF WHITE PLAINS, NEW YORK, ASSIGNOR, BY MESNE ASSIGNMENTS, TO BAKER PERKINS COMPANY, INC., OF SAGINAW, MICHIGAN, A CORPORATION OF NEW YORK.

AIR-COOLING MEANS FOR MIXING DEVICES.

Application filed November 28, 1923. Serial No. 677,460.

This invention relates to mixing devices for mixing dough and similar materials.

Mixing devices of this character usually comprise a receptacle or bowl in which the materials to be mixed are placed and a device rotatably mounted in the receptacle and arranged to be rotated at a relatively slow speed to mix the materials.

In the operation of mixing devices of this character the temperature of the materials is often raised considerably by the mechanical action during the mixing operation. The materials before they are placed in the mixing receptacle are often stored in lofts where the temperature is relatively high so that the ingredients have a comparatively high temperature before the mixing operation. The result is that the temperature of the mass after passing through the mixer is often too high for satisfactory results in the after treatment to which the materials are subjected. In the case of dough for the making of bread or rolls the temperature should not be raised above 80° F. in order that the subsequent "raising" of the dough may be performed with the best results.

The primary object of the present invention is to improve the construction and mode of operation of mixing devices of the character described with a view of preventing the heating up of the materials during the mixing operation. Mixing devices of this kind have heretofore been provided with devices for cooling the materials during the mixing operation. These devices, however, have not proved satisfactory in operation and therefore have not gone into general use.

With the above objects in view certain features of the invention relate to mechanism for cooling the materials in the mixing receptacle by the circulation of relatively cool air therethrough. In the preferred form of the invention, means is provided for delivering the cool air into the mixing receptacle and also for positively withdrawing the warmer air therefrom, thus insuring a continuous and rapid change of air within the receptacle. Also it is preferred to provide means for passing the air through a refrigerating and cooling device before it is delivered into the mixing receptacle so that the air introduced into the receptacle will have a relatively low temperature. The air withdrawn from the receptacle may be passed through the refrigerating device and then again delivered to the mixing receptacle, thus enabling a continuous circulation of air through the circuit including the refrigerating device and the mixing receptacle to be maintained.

Another feature of the invention consists in the provision of means for delivering cool air into the mixing receptacle at the point where the greatest heat is developed, thus enabling the most effective results to be secured from the delivery of the cool air. In the form of the invention illustrated in the drawing, this is the point in the upper part of the receptacle in which the parts of the rotary mixer most rapidly approach the side wall of the mixing chamber during rotation of the mixer.

The features of the invention will be clearly understood from the accompanying drawings illustrating the invention in its preferred form and the following detailed description of the constructions therein shown.

In the drawings—

Fig. 1 is a view in front elevation illustrating a mixing device embodying the present invention; and Fig. 2 is a sectional view taken substantially on the line 2—2 of Fig. 1.

In the form of the invention illustrated in the drawings of this application, the mixing device comprises a mixing bowl or receptacle indicated at 2 supported at its ends upon standards 4 projecting upwardly from a base 6, the frame preferably being of hollow metallic construction as shown in the drawing. The mixing receptacle has the shape in cross section clearly shown in Fig. 2, the lower portion of the receptacle being semi-cylindrical as shown in this figure.

Within the receptacle 2 is rotatably mounted a mixing device comprising bars or plates 8 mounted upon a rotatable shaft 10 at the opposite ends of the receptacle 2. The bars 8 have arms extending in opposite directions from the shaft 10 as shown in Fig. 2 and the corresponding arms on the respective plates are connected by cross rods 12. When the shaft 10 is rotated, cross rods 12 engage the materials within the receptacle 2 and thoroughly mix the same.

The shaft 10 is mounted in bearings 14 carried by the standards 4 and is arranged to be driven at a relatively slow speed from a driving shaft 16 mounted in bearings in the base 6 through a train of speed reducing gearing. This gearing comprises a pair of gears 18 mounted on the shaft 10 within the hollow standards 4 and relatively small gears 20 mounted on a shaft 22 journalled in bearings in the base 6, the gears 20 meshing with the gears 18. This gearing also comprises a gear 24 secured to the shaft 22, this gear being considerably larger than the gear 20 and a relatively small gear 26 mounted on the shaft 16 and meshing with the gear 24.

In the present form of the invention, the receptacle 2 is provided with a top plate 28 having an opening 30 through which the materials to be mixed may be introduced into the receptacle, this opening being closed by a cover plate 32.

In order to reduce the temperature of the materials in the receptacle, relatively cool air is introduced into the receptacle through an inlet pipe 34. This pipe has a shape in front substantially the same as the outlet pipe 44 clearly shown in Fig. 1, the pipe extending substantially across the receptacle. The pipe 34 is located so that the cool air delivered therethrough will strike the materials in the mixer substantially at the point where greatest heat develops. This is the point at which the rods 12 after passing across the upper portion of the receptacle approach closely to the side wall of the receptacle. The rods throw the materials with considerable force against the side wall at this point and squeeze the materials between the side wall and said rods. The materials will be heated at this point to the greatest degree on account of the impact of the materials against the side wall and because of the friction of the materials against the side wall at this point. The delivery of the current of cool air upon the materials at the point where the greatest heat is developed will result in the most efficient cooling of the material as will be evident.

The air is delivered to the inlet pipe 34 through the pipes 36, 38, the latter part being connected with a refrigerating device 40 through which the air is passed before entering the pipe 38. This refrigerating device may be of any suitable construction and is not shown in detail in this application. The pipe 38 is provided with a damper 41 which may be manually adjusted to control the amount of air delivered to the mixing receptacle.

After entering the mixing chamber the cool air circulates in the chamber as indicated by the arrows in Fig. 2, the air being caused to circulate through the chamber in this manner by the rotation of the rotary mixing device. After circulating through the mixing receptacle, the air preferably is positively withdrawn from the receptacle through an outlet pipe 42 also extending substantially the whole length of the receptacle. This outlet pipe is located at a point in the receptacle substantially opposite the inlet pipe 34. The relatively warm air passing outwardly through the outlet pipe 42 is preferably delivered back to the refrigerating device 40 through the pipes 44 and 46, the air being cooled in the refrigerating device and then delivered back to the mixing chamber. Thus a continuous circulation of air may be maintained throughout the system and the cooling mechanism may be operated with great efficiency. A suitable fan (not shown) may be located within the refrigerator 40, or at any other suitable point in the circuit for producing a continuous circulation of air through the circuit.

The cooling mechanism above described will prevent effectively the raising of the temperature of the materials in the mixing chamber above the maximum point required for satisfactory result in the subsequent "raising" or other treatment of the mixed materials. This mechanism is comparatively simple in construction and is highly efficient and economical in operation.

While the mixing device of the present machine is rotated at slow speed, the speed of rotation of this device may be high as compared with the usual dough mixing machine. The speed of rotation of the mixing device may be increased over that of the ordinary mixing machine since the circulation of cool air through the mixing chamber prevents the heating up of the dough to a temperature too high for satisfactory results in the future treatment to which the dough is subjected.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a mechanism embodying the invention in its preferred form, what is claimed is—

1. A mixing machine having in combination a mixing receptacle provided with a mixing chamber, a mixing device mounted for movement in said chamber, means for actuating said mixing device and means for delivering relatively cool air into said chamber and for withdrawing positively the warmer air therefrom.

2. A mixing machine having in combination a receptacle provided with a mixing chamber, a mixing device mounted for movement in said chamber, means for actuating said device, means for delivering air into the chamber and for withdrawing the air positively therefrom and a refrigerator through which the air is passed to cool the same before it is delivered to the chamber.

3. A mixing machine having in combination a receptacle provided with a mixing chamber, means for delivering relatively cool air into the chamber at one point therein and for withdrawing positively the warmer air therefrom at another point, a mixing device mounted for movement in the chamber and arranged to cause the air delivered into the chamber to circulate through the chamber along the wall thereof where the material is being mixed and to be carried toward the point of discharge and means for actuating said device.

4. A mixing machine having in combination a mixing chamber, a mixing device mounted to rotate on an axis extending in a general horizontal direction within said chamber, means for actuating said mixing device, an air inlet located on one side of said chamber and extending substantially throughout the length thereof, an air outlet located on the opposite side of said chamber and also extending substantially throughout the length thereof, and means for delivering relatively cool air through said inlet into said chamber and for withdrawing the air through said outlet after it has acted upon the material in the chamber.

5. A mixing machine having in combination a mixing chamber, a mixing device mounted to rotate within said chamber on an axis extending in a general horizontal direction, means for rotating said mixing device, means for delivering downwardly relatively cool air into said chamber on that side thereof at which the mixing device moves downwardly, and means for withdrawing upwardly air on that side of the chamber at which the mixing device moves upwardly after the air has acted upon the material being mixed.

6. A dough mixing machine having in combination a mixing chamber, a mixing device mounted to rotate within said chamber on an axis extending in a general horizontal direction, a refrigerator, means for delivering air from said refrigerator downwardly into said chamber close to the side wall thereof on that side at which the mixing device moves downwardly, an outlet through which the relatively warm air is discharged after acting upon the material in said chamber, and means for returning the air to said refrigerator.

Signed at New York city, New York, this 21st day of November, 1923.

LAURENCE S. HARBER.